United States Patent Office 2,756,141
Patented July 24, 1956

2,756,141

PROCESS FOR RECOVERING ALKALINE EARTH METAL FROM ADMIXTURE WITH ALKALI METAL

Albert Philip Giraitis, Baton Rouge, La., assignor to Ethyl Corporation, New York, N. Y., a corporation of Delaware No Drawing. Application December 11, 1952,
Serial No. 325,459

1 Claim. (Cl. 75—101)

The present invention relates to a process for recovering alkaline earth metal from admixture with an alkali metal, and more particularly to an improved process for treating mixtures of calcium and sodium so as to safely and efficiently recover metallic calcium therefrom.

U. S. Patent 2,543,406 discloses a process for treating mixtures of alkali metal and alkaline earth metal so as to recover therefrom the alkaline earth metal in an active form. More specifically, the process disclosed in this patent is directed to the treatment of sodium and calcium mixtures such as are obtained as a by-product sludge or residue in the electrolytic manufacture of metallic sodium. In general, the process consists of treating the metal mixture with a solvent, such as a lower aliphatic alcohol, which will selectively react with the alkali metal to form a soluble compound. These various solvents, and especially the lower aliphatic alcohols, although not inert to the alkaline earth metal, are more reactive toward the alkali metal and, therefore, the process of this patent takes advantage of this difference in reaction rates to effect the separation and recovery of the alkaline earth metal.

In carrying out such a process it is desirable to use an excess of alcohol so as to insure a more complete reaction and keep the alkali metal alcoholates that are formed as a by-product in solution. Although the process is generally satisfactory for recovering metallic calcium from small batches of electrolytic sludge, some difficulty has been experienced in the separation step when the operations are carried out on a commercial or semi-commercial scale. It has been observed that when alkaline earth metal and alcohol are co-present in certain proportions in the reaction mixture, a violent reaction tends to occur. Although this critical ratio has not been determined with certainty, it has been found that when treating sodium-calcium mixtures using methanol as the solvent, for example, if the ratio of alcohol to calcium is permitted to fall to about 1:1, this violent reaction may take place. When using other lower aliphatic alcohols up to and including amyl alcohol, this critical ratio has been found to be about the same. Since an excess of alcohol is present in the reaction mixture, it is necessary to pass through this critical range during the separation of calcium from the reaction mixture, thereby increasing the hazard to operating personnel and rendering the process commercially unattractive. It has been proposed to overcome this difficulty by carrying out the reaction between the solvent and metal mixture in the presence of a hydrocarbon liquid which is non-reactive with both the alkali metal and the alkaline earth metal, as it has been found that when such an inert liquid is present in sufficient quantity, the separation of the alkaline earth metal from the reaction mixture can be accomplished without danger of the aforementioned violent reaction. It has been found to be impractical, however, to carry out the reaction in the presence of an inert liquid since the desired reaction between the alkali metal and the alcohol is slowed down appreciably. As a result of my work in this field, however, I have discovered a technique whereby metal mixtures of the type described above can be reacted with a lower aliphatic alcohol in the presence of an inert medium without sacrificing high reaction rates.

Accordingly, it is an object of my invention to overcome the above disadvantages of the prior art and provide an improved process for recovering alkaline earth metal from admixture with alkali metal. A further object of my invention is to provide an improved process for recovering metallic calcium from admixture with sodium. A still further object of my invention is to provide an improved process for treating sludge such as is obtained in the electrolytic manufacture of sodium so as to efficiently and safely recover metallic calcium therefrom, while at the same time converting a portion of the sodium values to a useful commercial product. These and other objects of my invention will become apparent from a consideration of the following description.

The several objects of my invention are accomplished by initially dispersing a mixture of alkali metal and alkaline earth metal in an inert hydrocarbon medium which is non-reactive to the metals, and thereafter treating this dispersion with a lower aliphatic alcohol in the manner similar to that described in the aforementioned patent so as to recover the alkaline earth metal. The effect of initially dispersing the mixture in an inert liquid medium is to uniformly distribute the metallic particles, and in particular the alkali metal particles, throughout the inert medium thereby presenting a vastly increased surface area available for reaction with the alcohol. By so doing the subsequent reaction of alcohol with the alkali metal takes place very rapidly. In spite of this rapid reaction with alkali metal, the presence of the inert medium is effective in preventing any substantial reaction between the alkaline earth metal and alcohol so as to permit the separation of the alkaline earth metal from the reaction mixture in a safe manner without danger of the violent reaction heretofore experienced. As an alternative, the dispersion can can be processed prior to reaction with alcohol so as to recover a portion which is rich in alkaline earth metal and another portion which consists essentially of a suspension or dispersion of alkali metal particles in the inert medium. This latter dispersion can then be used as such in many chemical reactions where a highly reactive form of alkali metal is desired, while the portion containing the alkaline earth metal can be treated with alcohol in the above manner so as to recover that metal.

Although the process of my invention is generally applicable to any mixture containing alkali metal and alkaline earth metal such as, for example, mixtures of sodium-calcium, sodium-magnesium, potassium-barium, and the like, the process will be described primarily in relation to the recovery of calcium from the sludge or residue which is obtained as a waste product in the electrolytic manufacture of metallic sodium. In manufacturing sodium by the electrolysis of fused sodium chloride, it is common practice to incorporate calcium chloride in the electrolyte for the purpose of lowering its melting point. Thus, during electrolysis, both calcium and sodium are produced at the cathode. This crude mixture of sodium and calcium is purified by mechanical means so as to obtain substantially pure metallic sodium as the principal product, and a residue or sludge which contains appreciable quantities of both sodium and calcium. Generally, this sludge or residue, which is in the form of a sodium matrix in which are embedded crystalline calcium particles, will contain between 15 to 30 weight per cent calcium, about 70 per cent sodium, and small amounts of solid impurities such as the oxides of calcium and sodium. The process of my invention is admirably suited to treating such metal mixtures so as to recover both the sodium and calcium values contained therein.

In accordance with my invention the sludge or metal mixture is initially dispersed in an inert hydrocarbon medium. In general, this is accomplished by subjecting the mixture to vigorous agitation in the presence of the inert liquid while maintaining a temperature above the melting point of the sodium. The agitation necessary to form the dispersion can be achieved by the use of a simple stirrer or a counter-rotating stirrer operated at between 5,000 and 15,000 R. P. M. Obviously other means can be used to accomplish the necessary agitation to produce the dispersion. The agitation subdivides the matrix so as to liberate the calcium particles from the sodium and uniformly disperse the sodium in the form of small particles throughout the inert medium. The amount of inert medium used in forming such a dispersion is not especially critical, although I have found it desirable to use an amount equivalent to at least 10 times the weight of metal mixture employed. Similarly, the particular characteristics of the inert medium are not severe except that it should be non-reactive with both calcium and sodium, and preferably have a boiling point above the melting point of sodium so as to permit the preparation of the dispersion at normal pressure. Thus, a number of hydrocarbons, both aromatic and aliphatic, can be employed. Typical examples of hydrocarbons which can be used include octane, decane, undecane, nonane, benzene, xylene, toluene, petroleum fractions, alkylate, kerosene, gasoline, naptha, tetralin, decalin, and the like, to mention a few.

After preparing a dispersion of the metallic mixture as described above, the dispersion is treated with a lower aliphatic alcohol so as to permit the recovery of metallic calcium. In accordance with one embodiment of my invention, prior to treating the dispersion with alcohol, the dispersion can be separated into two fractions, one consisting essentially of a suspension of metallic sodium in the inert liquid and the other containing substantially all of the metallic calcium present in the original mixture along with some residual sodium. When the inert liquid chosen for the dispersing medium has a specific gravity less than that of calcium, this separation can be accomplished by allowing the dispersion to settle and thereafter decanting the top portion, which will be the sodium dispersion, from the lower portion, which will be the calcium-rich fraction. Obviously, this separation can also be accomplished by other classification means such as centrifugation and the like. The fraction consisting essentially of dispersed sodium can be used as such in commercial processes, or, if desired, can be treated so as to recover bulk sodium by evaporating or otherwise removing the inert medium.

In order to recover calcium, the dispersion or calcium-rich fraction thereof is then treated with an organic solvent in accordance with the process described in the aforementioned patent. In general, the lower aliphatic alcohols such as methanol, ethanol, propanol, and isopropanol, as well as the various butyl and amyl alcohols can be used effectively as solvents. In the present invention isopropyl, butyl and amyl alcohols are the preferred solvents since these are highly miscible with the inert hydrocarbons mentioned above and thus afford a single-phase liquid medium throughout the process. It is generally preferred to employ an amount of lower aliphatic alcohol which is between 15 and 30 per cent in excess of that theoretically required to convert all the sodium present in the mixture to alcoholate. The use of an excess of alcohol not only insures a more complete reaction, but serves to retain the by-product alcoholate in solution. In practice, the dispersion or calcium-rich fraction is placed in a conventional reaction vessel provided with a reflux condenser and the alcohol solvent charged to this mixture. As previously indicated, although calcium is not inert to these alcohols, there is a differential reaction rate between sodium and calcium so that the residence time, that is, the time of contact between the alcohol and the mixture, is important. In general, the lower alcohols will react more rapidly with both metals than the higher alcohols although the reaction in the case of calcium is at a much slower rate. The temperature also influences the relative reaction rates with alcohol, and in general the higher the temperature the more rapid is the reaction rate. This aspect of the basic process is described in the aforementioned U. S. Patent, 2,543,406. When operating in accordance with the present invention, however, it is preferred to carry out the reaction at or near the reflux temperature of the reaction mixture. Generally the heat of reaction is sufficient to maintain a steady reflux so that it is usually unnecessary to add heat to the system. The point at which all the sodium has reacted is indicated by the absence of hydrogen evolution from the reaction mixture, and it is at this point that the reaction mixture should be removed from the reactor and processed so as to separate the calcium. If too long a delay occurs, the calcium will begin reacting and hence decrease the yield, although, as indicated above, the presence of the inert liquid in the reaction mixture will prevent any violent reaction between the calcium and the alcohol.

After the reaction is complete the reaction mixture is subjected to filtration, centrifugation, or the like so as to recover the undissolved calcium metal. In transferring the reaction mixture from the reactor to the process equipment for separation it is desirable to maintain a temperature of about 40 to 50° C. so as to prevent crystallization of the alcoholate. The reaction mixture that is passed to the separation equipment thus consists of metallic calcium, sodium alcoholate, the excess alcohol and the inert hydrocarbon. However, since the inert hydrocarbon is present, the recovery of calcium from this mixture can be accomplished in a safe and efficient manner since the presence of the inert hydrocarbon is effective in preventing any violent reaction between the alcohol and the calcium such as has been heretofore experienced during the separation of calcium from the reaction mixture.

The following example in which the parts and percentages are given on a weight basis will serve to further illustrate my invention.

*Example*

Ten parts of a mixture of sodium and calcium obtained as a sludge in the electrolytic manufacture of sodium are dispersed in 100 parts of kerosene. The sludge or mixture contains 20 parts calcium, 70 parts sodium, and 10 parts solid impurities. The dispersion is formed by heating this mixture to a temperature of about 110° C. in the presence of the kerosene and subjecting the materials to the action of a counter-rotating stirrer operating at about 8,000 R. P. M. This agitation in continued for a period of about 40 minutes so as to completely disperse the particles of sodium uniformly throughout the kerosene. The dispersion so formed is then cooled to about 40° C. and 28 parts of isopropyl alcohol added. The alcohol and dispersion are allowed to remain in contact for a period of about 5 minutes, during which time the mixture is agitated and a temperature control maintained so that the reaction mixture does not become heated to above 50° C. After the reaction is complete the mixture is filtered so as to recover the undissolved calcium metal.

Although in the above example isopropyl alcohol is used, it is obvious that other lower aliphatic alcohols such as sec-butyl alcohol, amyl alcohol and the like can be employed with equally good results. Methanol and ethanol can also be used although they possess somewhat limited miscibility in the inert hydrocarbons. Similarly, benzene, toluene, octane, and other similar inert hydrocarbons can be used in place of kerosene as the dispersing medium. It is therefore to be understood that the above example is given only for the purpose of illustrating a specific embodiment of my invention, and I intend by the following claim to cover all modifications falling within the spirit and scope of my invention.

I claim:

In a process for recovering calcium from admixture with sodium by treating said mixture with a lower aliphatic alcohol, the improvement comprising the steps of subjecting said mixture to vigorous agitation in the presence of an inert hydrocarbon sufficient to substantially liberate the calcium from the sodium and uniformly disperse the sodium in the form of small particles throughout said inert medium, said agitation being conducted at a temperature above the melting point of sodium, separating the resulting mixture into fractions, one fraction consisting essentially of sodium dispersed in said inert medium and the other fraction containing substantially all of the calcium present in the original mixture, treating said other fraction with an excess of a lower aliphatic alcohol containing up to five carbon atoms, said treatment being conducted at about the reflux temperature of the reaction mixture, and separating the undissolved calcium from the reaction mixture.

References Cited in the file of this patent
UNITED STATES PATENTS
2,543,399   Calingaert _____ Feb. 27, 1951